US008880688B2

(12) United States Patent
Lee et al.

(10) Patent No.: US 8,880,688 B2
(45) Date of Patent: Nov. 4, 2014

(54) APPARATUS AND METHOD FOR PROVIDING PROFILE OF TERMINAL IN COMMUNICATION SYSTEM

(75) Inventors: Ji-Cheol Lee, Suwon-si (KR); Alper Yegin, Istanbul (TR); Sung-Ho Choi, Suwon-si (KR); Song-Yean Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 45 days.

(21) Appl. No.: 13/368,792

(22) Filed: Feb. 8, 2012

(65) Prior Publication Data

US 2012/0203894 A1 Aug. 9, 2012

(30) Foreign Application Priority Data

Feb. 8, 2011 (KR) .................. 10-2011-0010899

(51) Int. Cl.
*G06F 15/173* (2006.01)
*H04W 8/18* (2009.01)

(52) U.S. Cl.
CPC ..................... *H04W 8/18* (2013.01)
USPC ....................................... 709/224

(58) Field of Classification Search
CPC ....... H04W 4/005; H04W 12/00; H04W 8/18; H04W 9/32
USPC .................... 709/224–225; 370/349
See application file for complete search history.

(56) References Cited

U.S. PATENT DOCUMENTS

| 7,369,533 B1 * | 5/2008 | Raman .......................... 370/349 |
| 2010/0057485 A1 * | 3/2010 | Luft ................................ 705/1 |
| 2012/0124201 A1 * | 5/2012 | Muhanna et al. ............. 709/224 |

* cited by examiner

*Primary Examiner* — Vivek Srivastava
*Assistant Examiner* — Karina J Garcia-Ching (57) ABSTRACT

An apparatus and a method support Machine to Machine (M2M) communication in a communication system. A method for providing an M2M service includes determining at least one of identifier (ID) information of an M2M device, ID information of an M2M Service Provider (MSP), and service type information of the M2M device to provide the M2M service. The method also includes determining a profile of the M2M device using the at least one information determined. The method further includes transmitting the profile of the M2M device to an Authentication, Authorization and Accounting (AAA) server.

20 Claims, 7 Drawing Sheets

APPARATUS AND METHOD FOR PROVIDING PROFILE OF TERMINAL IN COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 8, 2011, and assigned Serial No. 10-2011-0010899, the entire disclosure of which is hereby incorporated by reference.

TECHNICAL FIELD OF THE INVENTION

The present disclosure relates generally to an apparatus and a method for supporting Machine to Machine (M2M) communication in a communication system.

BACKGROUND OF THE INVENTION

Research is being conducted on a Machine to Machine (M2M) communication service supporting data communication between devices in which there is little or very limited human interaction. The M2M communication service is drawing attention in terms of cost reduction in managing devices through automatic control and communication. For example, the M2M communication is applicable to telematics, health care, navigation, smart metering, vending machines, and security services.

To provide M2M communication, an M2M device offers the communication service over a wired/wireless network standardized in the related art. For example, the M2M device can provide the service using a wireless network defined in the Institute of Electrical and Electronics Engineers (IEEE) 802.16 communication standard. In this case, the M2M device serves as a mobile station as defined in the IEEE 802.16 communication standard.

As discussed above, the M2M device provides the M2M communication service over the wired/wireless communication network standardized in the related art. Accordingly, a communication carrier stores a profile of the M2M device defined through an agreement with a M2M service provider. Yet, there is no way to dynamically add the profile of the M2M device to a subscriber database (DB) of the communication carrier. As a result, the communication carrier updates the DB of an Authentication, Authorization and Accounting (AAA) server every time it makes the agreement with the M2M service provider regarding a new M2M service.

Thus, what is needed is a method for dynamically adding the profile of the M2M device to the subscriber DB of the communication carrier.

SUMMARY OF THE INVENTION

To address the above-discussed deficiencies of the prior art, it is a primary aspect of the present disclosure to provide an apparatus and a method for supporting M2M communication in a communication system.

Another aspect of the present disclosure is to provide an apparatus and a method for dynamically applying a profile of an M2M device in a communication system.

Yet another aspect of the present disclosure is to provide an apparatus and a method for dynamically applying a profile according to characteristics of an M2M device in a communication system.

Still another aspect of the present disclosure is to provide an apparatus and a method for managing a profile and a policy of an M2M device in an M2M service provider of a communication system.

A further aspect of the present disclosure is to provide an apparatus and a method for dynamically providing a profile according to characteristics of an M2M device in a management server of a communication system.

According to one aspect of the present disclosure, a method for providing a Machine to Machine (M2M) service in a communication system includes determining at least one of identifier (ID) information of an M2M device, ID information of an M2M Service Provider (MSP), and service type information of the M2M device to provide the M2M service. The method also includes determining a profile of the M2M device using the at least one information determined. The method further includes transmitting the profile of the M2M device to an Authentication, Authorization and Accounting (AAA) server.

According to another aspect of the present disclosure, an apparatus configured to provide an M2M service in a communication system includes a communication interface configured to transmit and receive a signal. The apparatus also includes a controller configured to determine a profile of the M2M device using at least one of ID information of an M2M device, ID information of an MSP, and service type information of the M2M device to provide the M2M service. The controller is also configured to control to transmit the profile of the M2M device to an AAA server through the communication interface.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for dynamically applying a profile of a Machine to Machine (M2M) device in a communication system.

Figure 1:
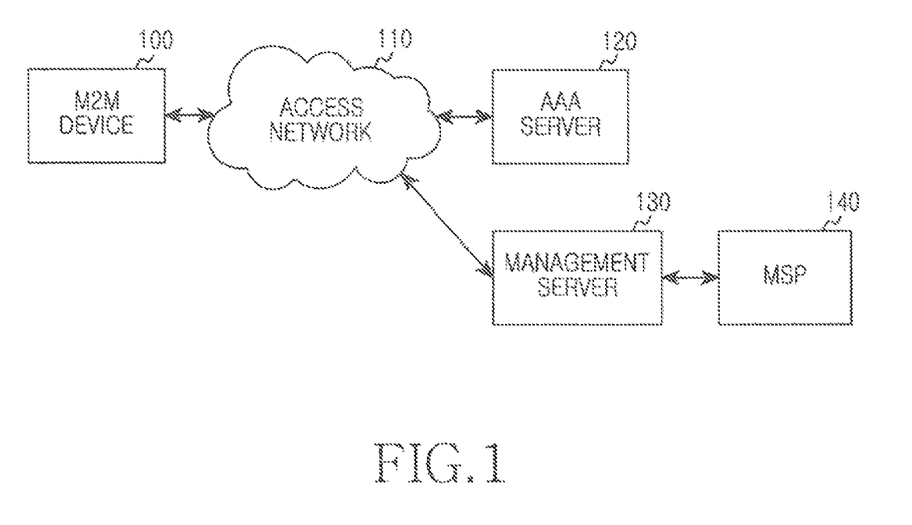
FIG. 1 illustrates a communication system according to an embodiment of the present disclosure.

FIG. 1 depicts a communication system according to an embodiment of the present disclosure.

As shown in FIG. 1, the communication system includes an M2M device 100, an access network 110, an Authentication, Authorization and Accounting (AAA) server 120, a management server 130, and an M2M Service Provider (MSP) 140.

The M2M device 100 is a device having an application program associated with the M2M communication.

The access network 110 is a wired or wireless network for communication between the M2M device 100 and the management server 130 and communication between the M2M device 100 and the AAA server 120. For example, as the wireless network, the access network 110 includes a base station and an Access Service Network Gateway (ASN-GW). Herein, the base station and the ASN-GW provide radio resources associated with the communication between the M2M device 100 and the AAA server 120 or between the M2M device 100 and the management server 130.

The AAA server 120 controls the M2M device 100 according to authentication of the M2M device 100 and a profile of the M2M device 100.

The management server 130 provides the AAA server 120 with the profile of at least one M2M device accessing for the M2M communication. The management server 130 may control a bootstrap procedure with the M2M device 100. That is, the management server 130 may control an initial setting for the M2M service of the M2M device 100.

The MSP 140 provides the M2M service for at least one M2M device.

Now, operations of the communication system for dynamically applying the profile of the M2M device are explained. Herein, the profile includes a traffic pattern transmitted and received by the M2M device using the M2M service, a charging type, service region information, and time control schedule information. When the M2M service is provided over the wireless network, the profile further includes frequency pattern information.

Figure 2:
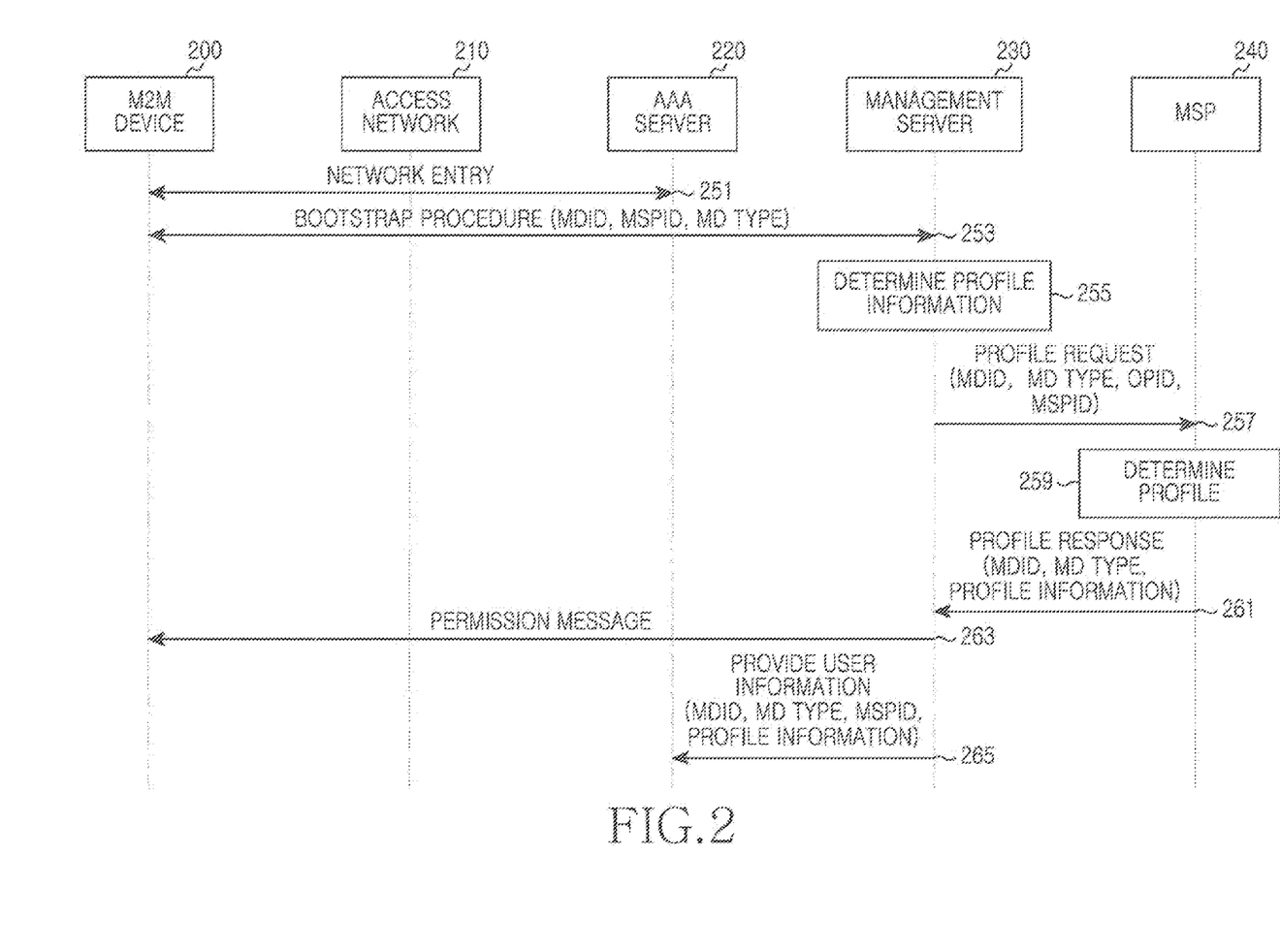
FIG. 2 illustrates a method for applying a profile of an M2M device in the communication system according to one embodiment of the present disclosure.

FIG. 2 depicts a method for applying the profile of the M2M device in the communication system according to one embodiment of the present disclosure. Hereinafter, an MSP 240 may include a service providing server.

As shown in FIG. 2, an M2M device 200 performs a network entry procedure with an AAA server 220 via an access network 210 to receive the M2M service in step 251. For example, when the access network 210 conforms to the Institute of Electrical and Electronics Engineers (IEEE) 802.16 communication system standard, the M2M device 200 exchanges Range (RNG)-Request (REQ)/Response (RSP), Subscriber station Basic Capability (SBC)-REQ/RSP, Private Key Management (PKM)-REQ/RSP, and Registration (REG)-REQ/RSP messages with al least one node of the access network 210.

Next, the M2M device 200 performs a bootstrap procedure with a management server 230 over the access network 210 in step 253. That is, the M2M device 200 and the management server 230 initialize the M2M service through the bootstrap procedure. In so doing, the M2M device 200 transmits an M2M Device ID (MDID), an MSP ID (MSPID), and M2M device type information, to the management server 230. Herein, the M2M device type indicates the service type of the M2M device. For example, the M2M device type may include telematics, health care, navigation, smart metering, vending machines, and the like.

The management server 230 determines the MSPID received from the M2M device 200 in step 255 and requests the profile of the M2M device 200 to the MSP 240 using the MSPID in step 257. For example, the management server 230 sends a profile request message including the MDID, the M2M device type, the MSPID, and an Operator ID (OPID) to the MSP 240.

The MSP 240 determines whether to accept the M2M service for the M2M device 200 of which the profile is requested by the management server 230. When accepting the M2M service of the M2M device 200, the MSP 240 determines the profile of the M2M device 200 using the MDID of the profile request message in step 259.

Next, the MSP 240 sends a profile response message including the profile of the M2M device 200 to the management server 230 in step 261. Herein, the profile response message includes the MDID, the M2M device type, and the profile of the M2M device 200. By contrast, when not granting the M2M service of the M2M device 200, the MSP 240 may send the profile response message including out-of-service information to the management server 230.

When determining the M2M service grant information of the M2M device 200 in the profile response message, the management server 230 sends a permission message to the M2M device 200 in step 263.

The management server 230 forwards the profile of the M2M device 200 to the AAA server 220 to provide the M2M service in step 265. In so doing, the management server 230 transmits the MDID, the M2M device type, and the MSPID together with the profile of the M2M device 200.

Next, the AAA server 220 controls traffic of the M2M device 200 according to the profile of the M2M device 200.

In this embodiment, the MSP 240 transmits the profile of the M2M device 200 to the management server 230 according to the profile request of the management server 230.

Alternatively, the MSP 240 may transmit a profile ID of the M2M device 200 to the management server 230 according to the profile request of the management server 230. For example, when the management server 230 stores at least one M2M service profile, the MSP 240 can transmit the profile ID of the M2M device 200 to the management server 230 according to the profile request of the management server 230. For example, when the AAA server 220 stores at least one M2M service profile, the MSP 240 can transmit the profile ID of the M2M device 200 to the management server 230 according to the profile request of the management server 230. In so doing, the management server 230 may provide the profile ID of the M2M device 200 also to the AAA server 220.

Figure 3:
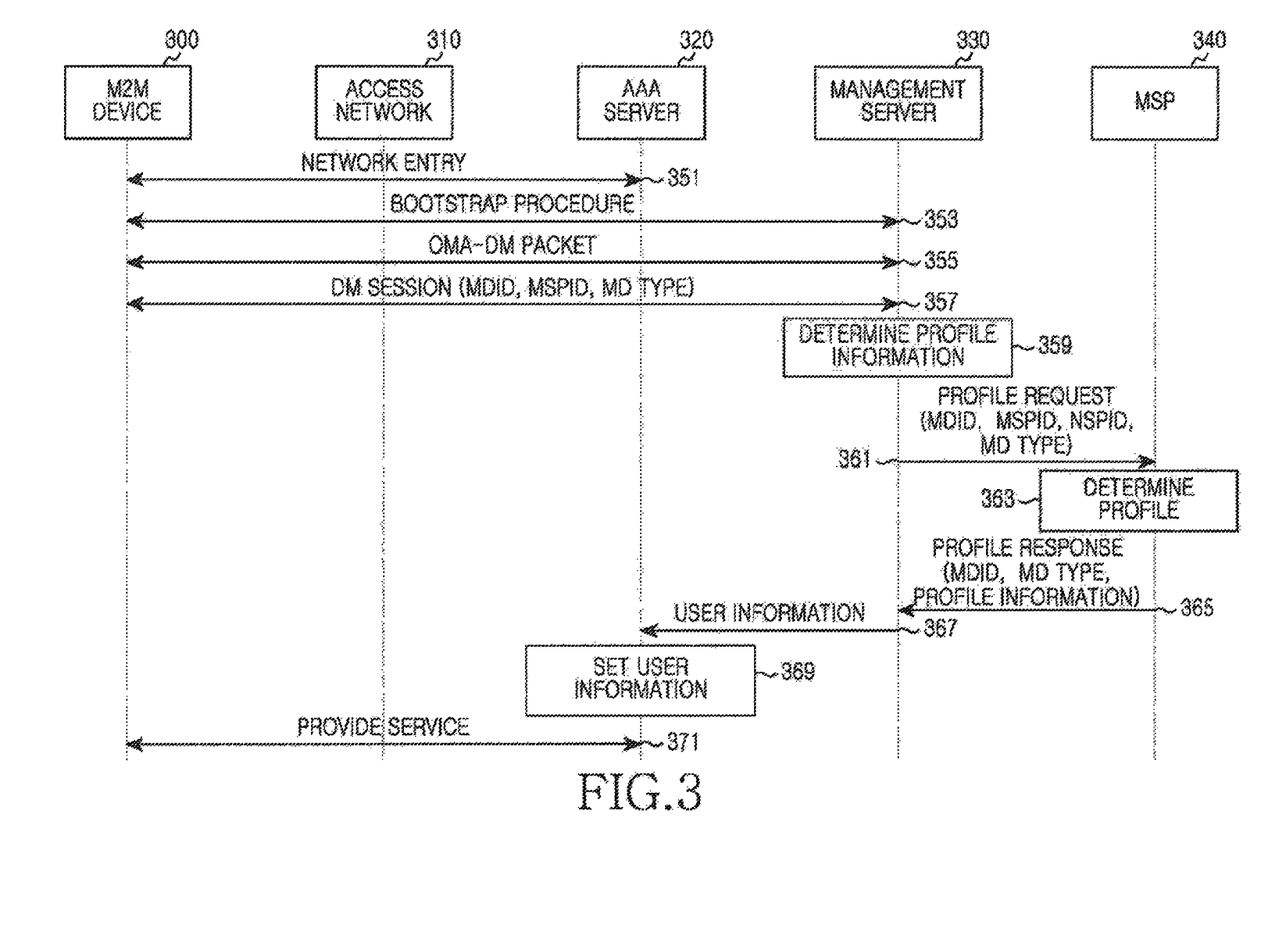
FIG. 3 illustrates a method for applying the profile of the M2M device in the communication system according to another embodiment of the present disclosure.

In conformity with Open Mobile Alliance (OMA)-Device Management (DM), the communication system operates as shown in FIG. 3 to dynamically apply the profile of the M2M device. Herein, the OMA-DM specifies a device management method for managing firmware, software, and parameters in the terminal by reading, adding, modifying, and executing objects of the wireless terminal using DM protocol.

FIG. 3 illustrates a method for applying the profile of the M2M device in the communication system according to another embodiment of the present disclosure.

As shown in FIG. 3, an M2M device 300 performs the network entry procedure with an AAA server 320 over an access network 310 to receive the M2M service in step 351. For example, when the access network 310 conforms to the IEEE 802.16 communication system standard, the M2M device 300 exchanges RNG-REQ/RSP, SBC-REQ/RSP, PKM-REQ/RSP, and REG-REQ/RSP messages with at least one node of the access network 310.

Next, the M2M device 300 performs the bootstrap procedure with a management server 330 over the access network 310 in step 353. That is, the M2M device 300 and the management server 330 initialize the M2M service through the bootstrap procedure.

The M2M device 300 transmits an OMA-DM packet to the management server 330 to inform of the DM operation in step 355. Herein, the OMA-DM packet includes client credential and device information.

Next, the M2M device 300 and the management server 330 set a DM session in step 357. The M2M device 300 transmits the MDID, the MSPID, and the M2M device type information, to the management server 330. For example, a DM client of the M2M device 300 transmits the MSPID and the M2M device type information of its managing objects to the management server 330. Herein, the M2M device type indicates the service type of the M2M device. For example, the M2M device type may include telematics, health care, navigation, smart metering, vending machines, and the like.

The management server 330 determines the MSPID received from the M2M device 300 in step 359 and requests the profile of the M2M device 300 to the MSP 340 using the MSPID in step 361. For example, the management server 330 sends a profile request message including the MDID, the M2M device type, the MSPID, and NSPID to the MSP 340.

The MSP 340 determines whether to accept the M2M service for the M2M device 300 of which the profile is requested by the management server 330. When granting the M2M service of the M2M device 300, the MSP 340 determines the profile of the M2M device 300 using the MDID of the profile request message in step 363.

Next, the MSP 340 sends a profile response message including the profile of the M2M device 300 to the management server 330 in step 365. Herein, the profile response message includes the MDID, the M2M device type, and the profile of the M2M device 300. By contrast, when not granting the M2M service of the M2M device 300, the MSP 340 may send the profile response message including out-of-service information to the management server 330.

Upon determining the M2M service grant information of the M2M device 300 in the profile response message, the management server 330 provides the profile of the M2M device 300 to the AAA server 320 in step 367. In so doing, the management server 330 transmits the MDID, the M2M device type, and the MSPID together with the profile of the M2M device 300.

The AAA server 320 controls the traffic of the M2M device 300 by installing the profile of the M2M device 300 received from the management server 330 in step 369.

Next, the AAA server 320 provides the M2M service to the M2M device 300 in step 371.

In this embodiment, the MSP 340 transmits the profile of the M2M device 300 to the management server 330 according to the profile request of the management server 330.

Alternatively, the MSP 340 may transmit the profile ID of the M2M device 300 to the management server 330 according to the profile request of the management server 330. For example, when the management server 330 stores at least one M2M service profile, the MSP 340 can transmit the profile ID of the M2M device 300 to the management server 330 according, to the profile request of the management server 330. For example, when the AAA server 320 stores at least one M2M service profile, the MSP 340 can transmit the profile ID of the M2M device 300 to the management server 330 according to the profile request of the management server 330. In so doing, the management server 330 also provides the profile ID of the M2M device 300 to the AAA server 320.

As stated above, the AAA server controls the traffic of the M2M device according to the profile of the M2M device received from the M2M management server. When the AAA server controls the M2M device according to the time control scheduling information, the AAA server operates as shown in FIG. 4.

Figure 4:
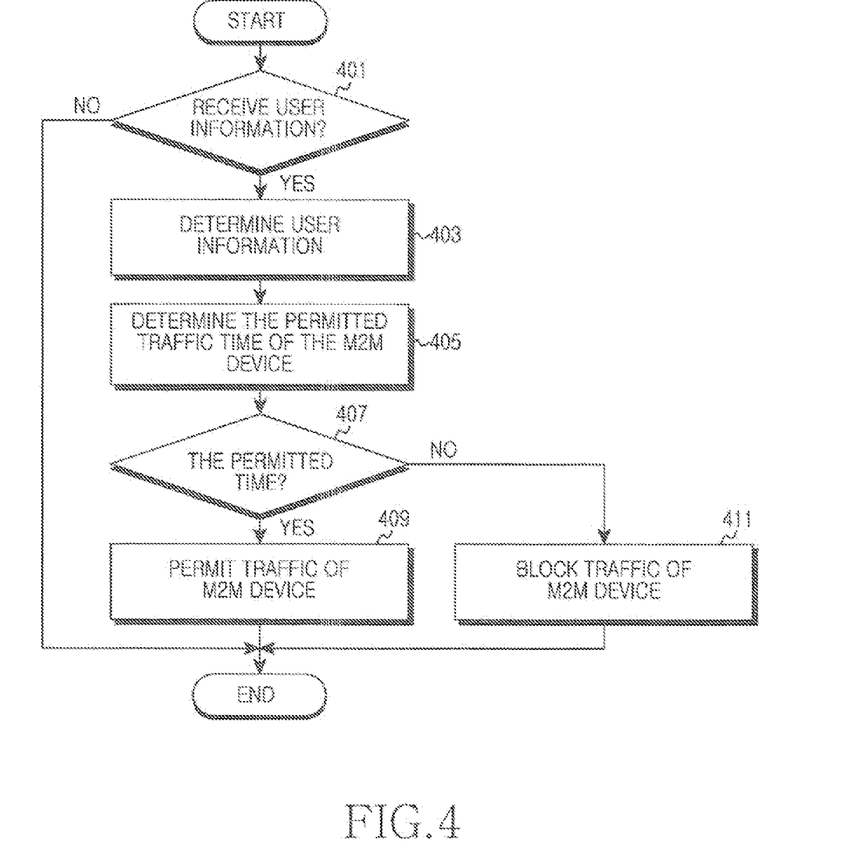
FIG. 4 illustrates a method of an AAA server for controlling the M2M device in the communication system according to an embodiment of the present disclosure.

FIG. 4 illustrates a method of the AAA server for controlling the M2M device in the communication system according to an embodiment of the present disclosure.

Referring to FIG. 4, the AAA server determines whether user information is received in step 401. For example, the AAA server determines whether the user information including the profile of the M2M device is received from the M2M service management server in FIG. 2 or FIG. 3. For example, the AAA server determines whether the user information including the profile ID of the M2M device is received from the M2M service management server.

When not receiving the user information, the AAA server finishes this process.

By contrast, upon receiving the user information from the M2M service management server, the AAA server determines the profile of the M2M device in step 403. For example, when receiving the profile ID from the M2M service management server, the AAA server fetches the profile corresponding to the profile ID from the DB.

When controlling the M2M device according to the time control schedule of the profile of the M2M device, the AAA server determines a permitted traffic time of the M2M device in the profile of the M2M device in step 405.

In step 407, the AAA server determines whether to permit the traffic of the M2M device by considering the current time.

When the traffic of the M2M device is permitted in the current time, the AAA server controls the ASN-GW to permit the traffic of the M2M device in step 409.

When the traffic of the M2M device is not permitted in the current time, the AAA server controls the ASN-GW to block the traffic of the M2M device in step 411.

Next, the AAA server finishes this process.

In this embodiment, the AAA server blocks the traffic of the M2M device according to the time control schedule information of the M2M device.

Alternatively, the AAA server may apply a different charging manner based on the traffic of the M2M device according to the time control schedule information of the M2M device.

In this embodiment, the communication system includes the management server separately from the MSP.

Figure 5:
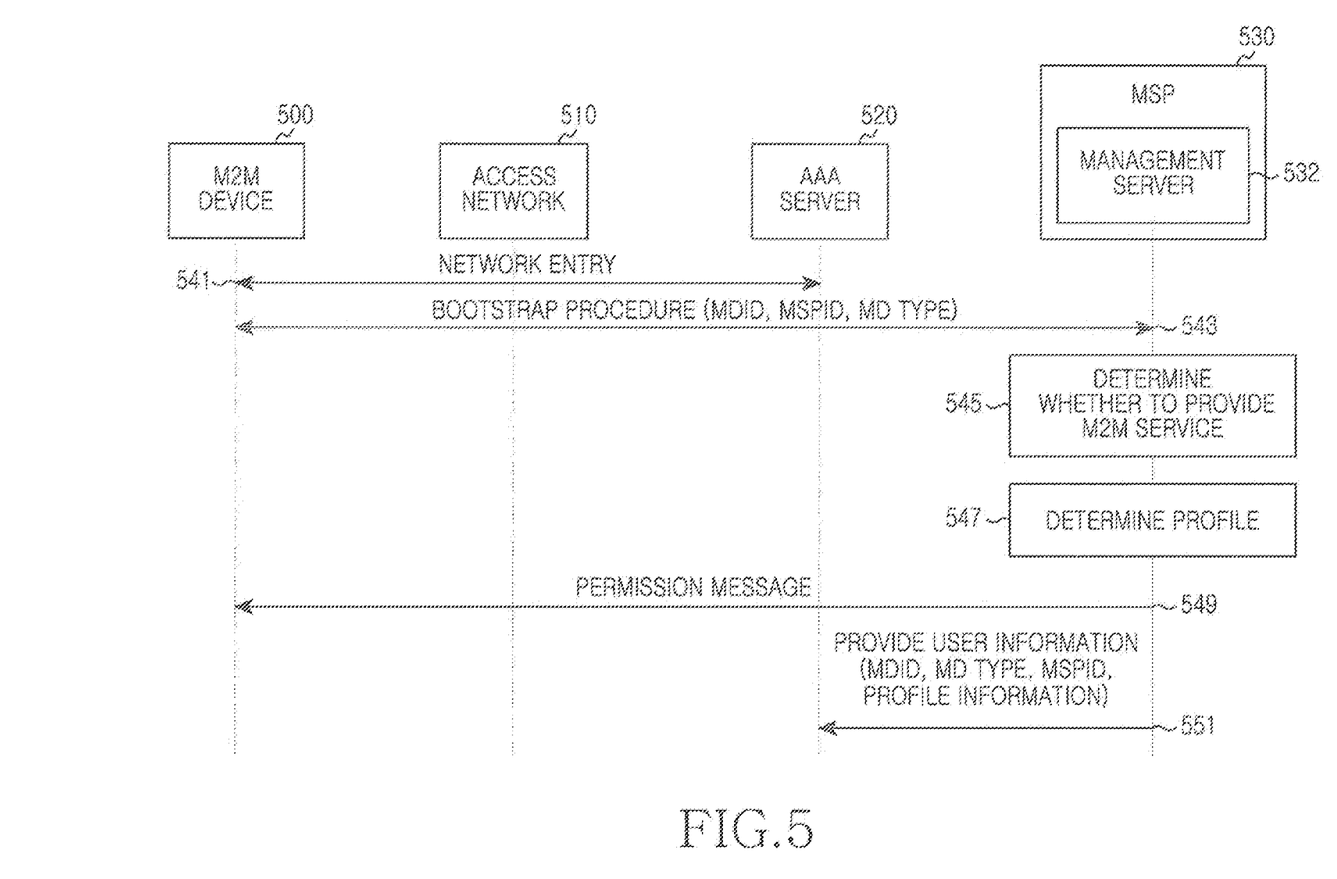
FIG. 5 illustrates a method for applying the profile of the M2M device in the communication system according to yet another embodiment of the present disclosure.
Figure 6:
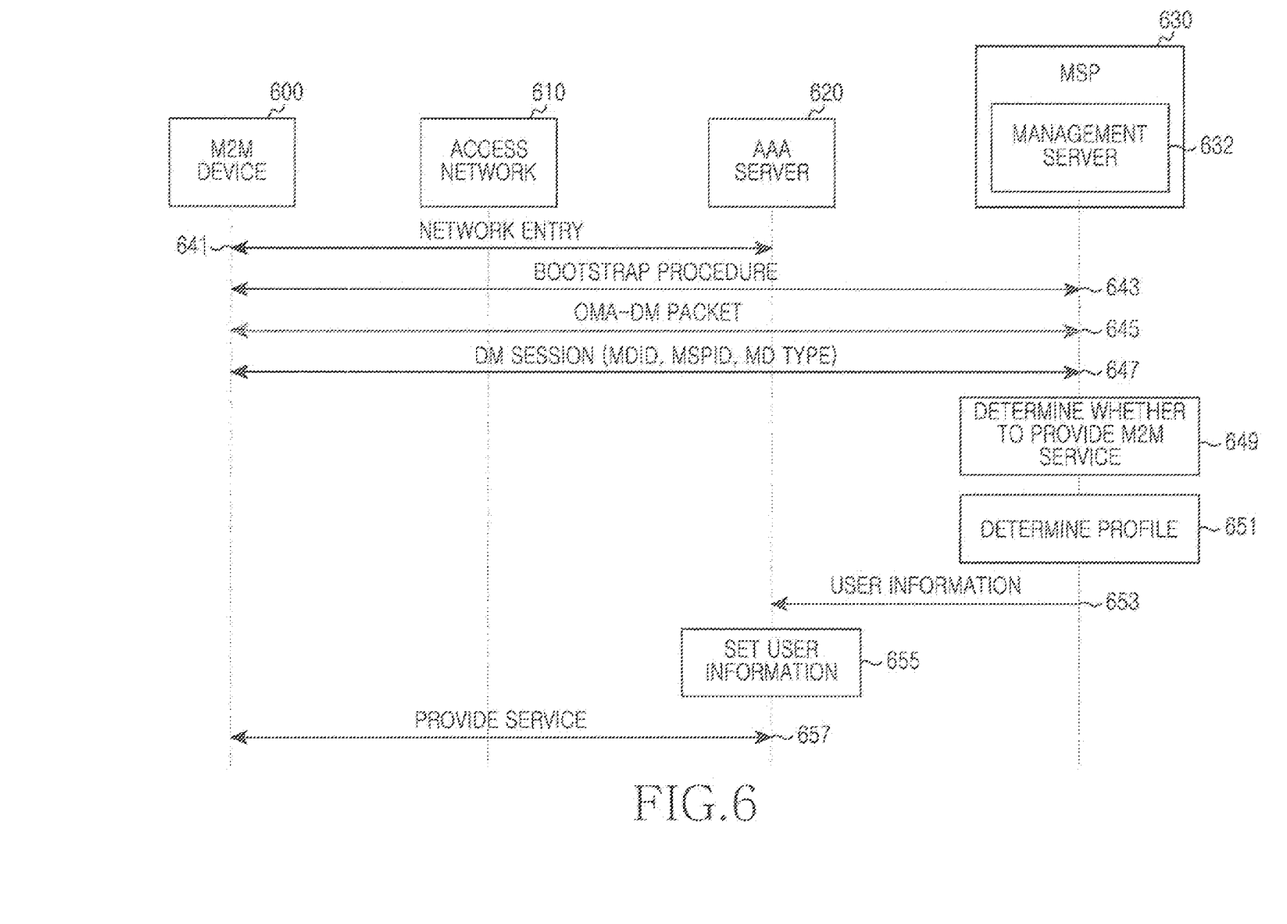
FIG. 6 illustrates a method for applying the profile of the M2M device in the communication system according to still another embodiment of the present disclosure.

Alternatively, when the MSP of the communication system includes the management server, the communication system can dynamically provide the profile of the M2M device as shown in FIG. 5 or FIG. 6.

FIG. 5 illustrates a method for applying the profile of the M2M device in the communication system according to yet another embodiment of the present disclosure. Hereafter, an MSP 530 may be implemented using a service providing server.

As shown in FIG. 5, an M2M device 500 performs the network entry procedure with an AAA server 520 over an access network 510 to receive the M2M service in step 541.

Next, the M2M device 500 performs the bootstrap procedure with a management server 532 of the MSP 530 over the access network 510 in step 543. That is, the M2M device 500 and the management server 532 initialize the M2M service through the bootstrap procedure. In so doing, the M2M device 500 transmits the MDID and the M2M device type information to the management server 532.

The management server 532 determines whether to accept the M2M service of the M2M device 500 in step 545. When accepting the M2M service of the M2M device 500, the management server 532 determines the profile of the M2M device 500 using the MDID in step 547.

When granting the M2M service of the M2M device 500, the management server 532 sends the permission message of the M2M service to the M2M device 500 in step 549.

Next, the management server 532 provides the profile of the M2M device 500 to the AAA server 520 to provide the M2M service in step 551. In so doing, the management server 532 transmits the MDID, the M2M device type information, and the MSPID together with the profile of the M2M device 500.

According to the profile of the M2M device 500, the AAA server 520 controls the traffic of the M2M device 500.

Using the OMA-DM, the communication system dynamically applies the profile of the M2M device as shown in FIG. 6.

FIG. 6 depicts a method for applying the profile of the M2M device in the communication system according to still another embodiment of the present disclosure.

As shown in FIG. 6, an M2M device 600 performs the network entry procedure with an AAA server 620 over an access network 610 to receive the M2M service in step 641. For example, when the access network 610 conforms to the IEEE 802.16 communication system standard, the M2M device 600 exchanges RNG-REQ/RSP, SBC-REQ/RSP, PKM-REQ/RSP, and REG-REQ/RSP messages with at least one node of the access network 610.

Next, the M2M device 600 performs the bootstrap procedure with a management server 632 of an MSP 630 via the access network 610 in step 643. That is, the M2M device 600 and the management server 632 initialize the M2M service through the bootstrap procedure.

The M2M device 600 transmits an OMA-DM packet to the management server 632 to inform of the DM operation in step 645. Herein, the OMA-DM packet includes the client credential and device information.

Next, the M2M device 600 and the management server 632 set the DM session in step 647. The M2M device 600 transmits the MDID and the M2M device type information to the management server 632. For example, the DM client of the M2M device 600 transmits the MSPID and the M2M device type information of its managing objects to the management server 632.

The management server 632 determines whether to accept the M2M service of the M2M device 600 in step 649. When accepting the M2M service of the M2M device 600, the management server 632 determines the profile of the M2M device 600 using the MDID in step 651.

The management server 632 provides the profile of the M2M device 600 to the AAA server 620 to provide the M2M service in step 653. In so doing, the management server 632 transmits the MDID and the M2M device type together with the profile of the M2M device 600.

The AAA server 620 controls the traffic of the M2M device 600 by installing the profile of the M2M device 600 received from the management server 632 in step 655.

Next, the AAA server 620 provides the M2M service to the M2M device 600 in step 657.

Figure 7:
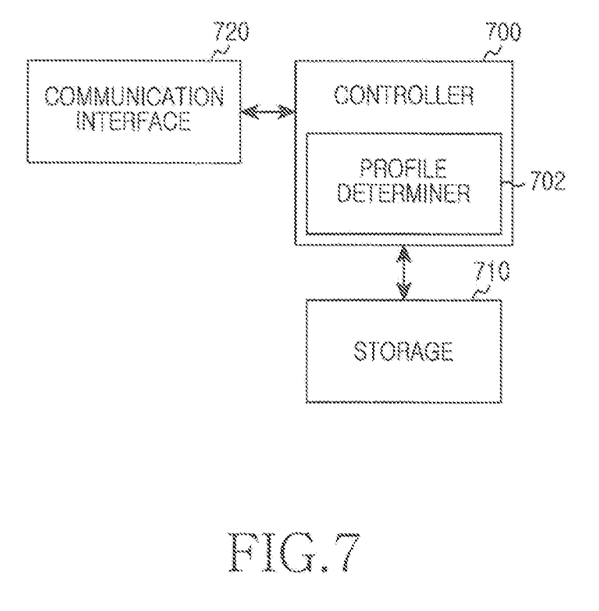
FIG. 7 illustrates a management server according to an embodiment of the present disclosure.

FIG. 7 is a block diagram of the management server according to an embodiment of the present disclosure.

As shown in FIG. 7, the management server includes a controller 700, a storage 710, and a communication interface 720.

The controller 700 controls the operations of the management server. For example, the controller 700 controls to initialize the M2M service of the M2M device through the bootstrap procedure with the M2M device. For example, the controller 700 may determine whether to accept the M2M service for the M2M device as shown in FIG. 5 or FIG. 6.

The controller 700 controls to provide the AAA server with the profile of the M2M device, which is fed from a profile determiner 702, via the communication interface 720 so as to provide the M2M service. In so doing, the controller 700 may control to provide the profile ID of the M2M device to the AAA server.

The profile determiner 702 determines the profile of the M2M device to provide the M2M service. For example, the profile determiner 702 requests the profile of the M2M device to the MSP using the MSPID provided from the M2M device as shown in FIG. 2 or FIG. 3. In so doing, the profile determiner 702 sends the profile request message including the MDID, the M2M device type, the MSPID, and the OPID to the MSP. Next, the profile determiner 702 obtains the profile of the M2M device from the profile response message received from the MSP.

For example, the profile determiner 702 requests the profile of the M2M device to the MSP using the MSPID provided from the M2M device as shown in FIG. 2 or FIG. 3. Next, the profile determiner 702 may obtain the profile of the M2M device in the storage 710 according to the profile ID received from the MSP.

For example, the profile determiner 702 may obtain the profile of the M2M device in the storage 710 using the MSPID received from the M2M device.

The storage 710 can include a program storage for storing a program to control the management server and a data storage for storing data generating in the program execution. For example, the storage 710 stores the profile of at least one M2M device.

The communication interface 720 controls to send and receive signals to and from the M2M device, the AAA server, and the MSP.

In this embodiment, the management server transmits and receives signals to and from the M2M device, the AAA server, and the MSP using the single communication interface 720.

Alternatively, the management server may include respective communication interfaces for transmitting and receiving signals to and from the M2M device, the AAA server, and the MSP.

As set forth above, the profile of the M2M device is dynamically applied in the communication system. Therefore, the service adequate for the characteristics of the M2M device can be provided, and the profile of the M2M device can be modified according to the environment and the service type after installing it to the M2M device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for providing a Machine to Machine (M2M) service by a management server in a communication system, comprising:
   determining information relating to an identifier (ID) information of an M2M Service Provider (MSP), and one or more of an ID information of an M2M device and a service type information of the M2M device to provide the M2M service;
   transmitting a profile request message requesting a profile of the M2M device and including the determined information using the ID information of the MSP to the MSP;
   receiving, by the management server, a profile response message that comprises: the profile of the M2M device, the ID information of an M2M device, and the service type information of the M2M device; and
   transmitting, by the management server, the profile of the M2M device to an Authentication, Authorization and Accounting (AAA) server.

2. The method of claim 1, wherein the profile of the M2M device comprises one or more of: a traffic pattern transmitted and received via the M2M service, a charging type, service region information, and time control schedule information.

3. The method of claim 1, wherein the determining information comprises:
   receiving the ID information of the MSP, and one or more of the ID information of the M2M device and the service type information of the M2M device from the M2M device through a bootstrap procedure with the M2M device.

4. The method of claim 1, wherein the determining information comprises:
   receiving the ID information of the MSP, and one or more of the ID information of the M2M device and the service type information of the M2M device from the M2M device through Device Management (DM) session establishment with the M2M device.

5. The method of claim 1, wherein after the profile request message is received, transmitting a permission message to the M2M device.

6. The method of claim 1 further comprising:
   determining a profile ID of the M2M device in the profile response message received from the MSP; and
   identifying the profile according to the profile ID of the M2M device among pre-stored profiles of one or more M2M devices.

7. The method of claim 1 further comprising:
   identifying the profile according to the ID information of the M2M device among pre-stored profiles of one or more M2M devices.

8. The method of claim 1, wherein the transmitting to the AAA server comprises:
   transmitting user information comprising one or more determined information and the profile of the M2M device to the AAA server.

9. The method of claim 6, wherein the transmitting to the AAA server comprises:
   transmitting the profile ID information of the M2M device to the AAA server.

10. The method of claim 1 wherein, when the M2M service is provided to the M2M device, the profile of the M2M device is determined.

11. An apparatus in a management server configured to provide a Machine to Machine (M2M) service in a communication system, the apparatus comprising:
   a communication interface configured to transmit and receive a signal; and
   a controller configured to:
      determine information relating to an identifier (ID) information of an M2M Service Provider (MSP), and one or more of an ID information of an M2M device, and a service type information of the M2M device to provide the M2M service;
      transmit to the MSP a profile request message that requests a profile of the M2M device and comprises the determined information using the ID information of the MSP;
      receive a profile response message comprising the profile of the M2M device, the ID information of an M2M device and the service type information of the M2M device; and
      transmit the profile of the M2M device to an Authentication, Authorization and Accounting (AAA) server through the communication interface.

12. The apparatus of claim 11, wherein the profile of the M2M device comprises one or more of: a traffic pattern transmitted and received via the M2M service, a charging type, a service region information, and time control schedule information.

13. The apparatus of claim 11, wherein, in a bootstrap procedure with the M2M device, the controller is configured to receive the ID information of the MSP, and one or more of the ID information of the M2M device and the service type information of the M2M device from the M2M device via the communication interface.

14. The apparatus of claim 11, wherein, in Device Management (DM) session establishment with the M2M device, the controller is configured to receive the ID information of the MSP, and one or more of the ID information of the M2M device and the service type information of the M2M device from the M2M device via the communication interface.

15. The apparatus of claim 11, wherein the controller is configured to transmit a permission message to the M2M device after the profile request message is received.

16. The apparatus of claim 11, further comprising:
a storage configured to store a profile of at least one M2M device,
wherein the controller is configured to identify the profile of the M2M device among the profile of the at least one M2M device stored to the storage using a profile ID of the M2M device in a profile response message received from the MSP.

17. The apparatus of claim 11, further comprising:
a storage configured to store a profile of at least one M2M device,
wherein the controller is configured to identify the profile of the M2M device according to the ID information of the M2M device among the profile of the at least one M2M device stored to the storage.

18. The apparatus of claim 11, wherein the controller is configured to transmit user information comprising one or more determined information and the profile of the M2M device to the AAA server.

19. The apparatus of claim 16, wherein the controller is configured to transmit the profile ID information of the M2M device to the AAA server.

20. The apparatus of claim 11, wherein when the M2M service is provided to the M2M device, the controller is configured to determine the profile of the M2M device.

* * * * *